(12) United States Patent
Suzuki

(10) Patent No.: US 8,819,189 B2
(45) Date of Patent: Aug. 26, 2014

(54) ADDRESS INFORMATION PROVIDING DEVICE

(75) Inventor: Satoshi Suzuki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 626 days.

(21) Appl. No.: 12/725,016

(22) Filed: Mar. 16, 2010

(65) Prior Publication Data

US 2010/0332623 A1 Dec. 30, 2010

(30) Foreign Application Priority Data

Jun. 29, 2009 (JP) ................................. 2009-153488

(51) Int. Cl.
*G06F 15/16* (2006.01)

(52) U.S. Cl.
USPC .......................................... 709/220; 709/228

(58) Field of Classification Search
USPC ........... 340/1.1–16.1; 709/220, 228; 710/104; 713/1, 100; 717/11
See application file for complete search history.

(56) References Cited

U.S. PATENT DOCUMENTS

| | | | | |
|---|---|---|---|---|
| 2002/0073335 | A1* | 6/2002 | Shuster | 713/201 |
| 2003/0197722 | A1* | 10/2003 | Sugauchi et al. | 345/736 |
| 2005/0102415 | A1 | 5/2005 | Ishiyama et al. | |
| 2006/0067343 | A1* | 3/2006 | Tagawa et al. | 370/401 |
| 2006/0067495 | A1* | 3/2006 | Otsuka | 379/142.01 |
| 2007/0047550 | A1 | 3/2007 | Takayama | |
| 2008/0062468 | A1 | 3/2008 | Shouno | |
| 2009/0041058 | A1* | 2/2009 | Ikeda et al. | 370/475 |

FOREIGN PATENT DOCUMENTS

| | | |
|---|---|---|
| JP | H04-175853 A | 6/1992 |
| JP | 2003-298635 A | 10/2003 |
| JP | 2004-064492 A | 2/2004 |
| JP | 2006-106881 A | 4/2006 |
| JP | 2007-089138 A | 4/2007 |
| JP | 2008-067235 A | 3/2008 |

OTHER PUBLICATIONS

P. Mockapetris, "Request for Comments: 1101," ISI (Apr. 1989) 3-4.*
Muhammad Ehsan ul Haq et al., "Compact and User-Friendly Representation of IPv6 Addressing Approach and Masking," Institute of Electrical and Electronics Engineers (2009).*
R. Hinden et al., "IP Version 6 Addressing Architecture," Network Working Group, RFC 4291, Feb. 2006.*
Japanese Official Action dated Apr. 1, 2014 received in related application JP 2013-117147.
Li et al., "IPv6 Advanced Protocols Implementation", United States of America, Morgan Kaufmann, 2007, pp. 283-287, ISBN:978-0-12-370479-5.

* cited by examiner

*Primary Examiner* — Phuoc Nguyen
*Assistant Examiner* — Davoud Zand
(74) *Attorney, Agent, or Firm* — Scully, Scott, Murphy & Presser, P.C.

(57) ABSTRACT

An address information providing device may be provide with an obtaining unit configured to obtain address information indicating an IPv6 address, a creation unit configured to create address information for display from the address information, and a supplying unit configured to supply the address information for display to a display device. The address information for display may be information in which a prefix portion of the address information has been replaced by a particular symbol. The address information for display may be information in which a prefix portion of the address information has been omitted.

10 Claims, 11 Drawing Sheets

FIG. 5A
Combination Information 200 From Printer 50
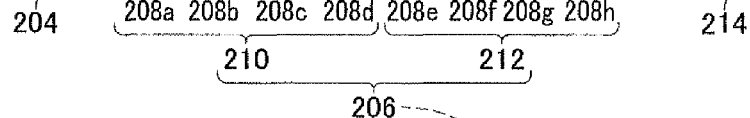
Combination Information 220 From Printer 60
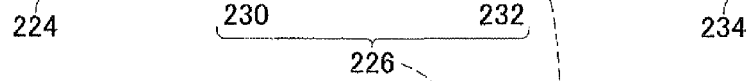
Combination Information 240 From Printer 70
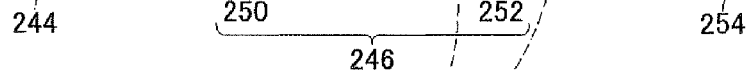
FIG. 5B
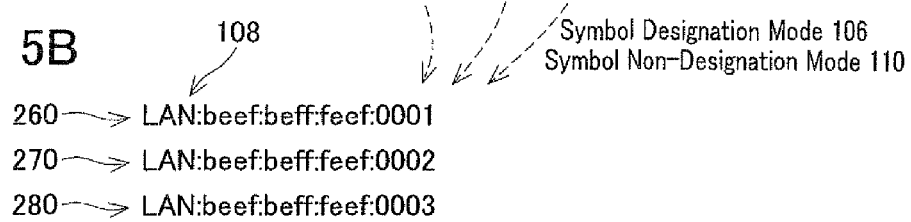
FIG. 5C
| Node Name | IPv6 Address | |
|---|---|---|
| printer 50 | LAN:beef:beff:feef:0001 | |
| printer 60 | LAN:beef:beff:feef:0002 | |
| printer 70 | LAN:beef:beff:feef:0003 | |

FIG. 6A
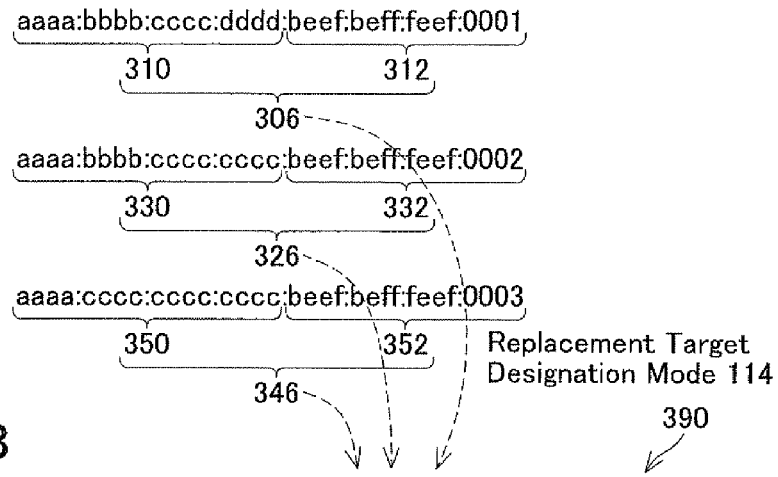
FIG. 6B
FIG. 7A
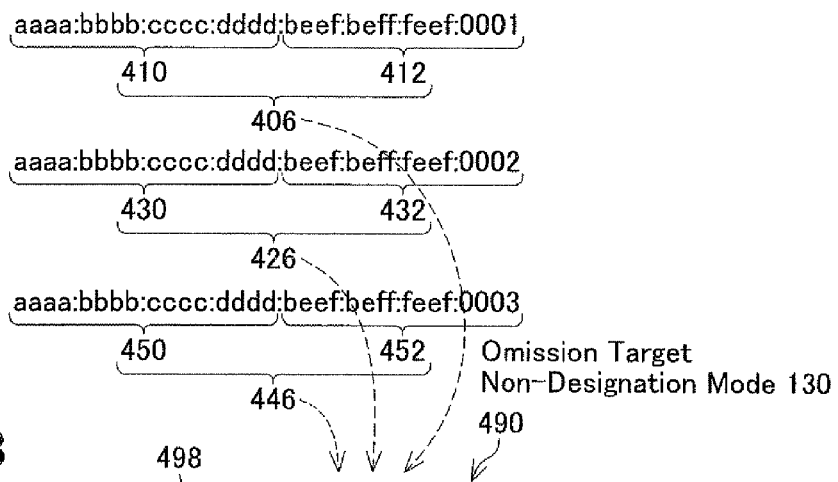
FIG. 7B

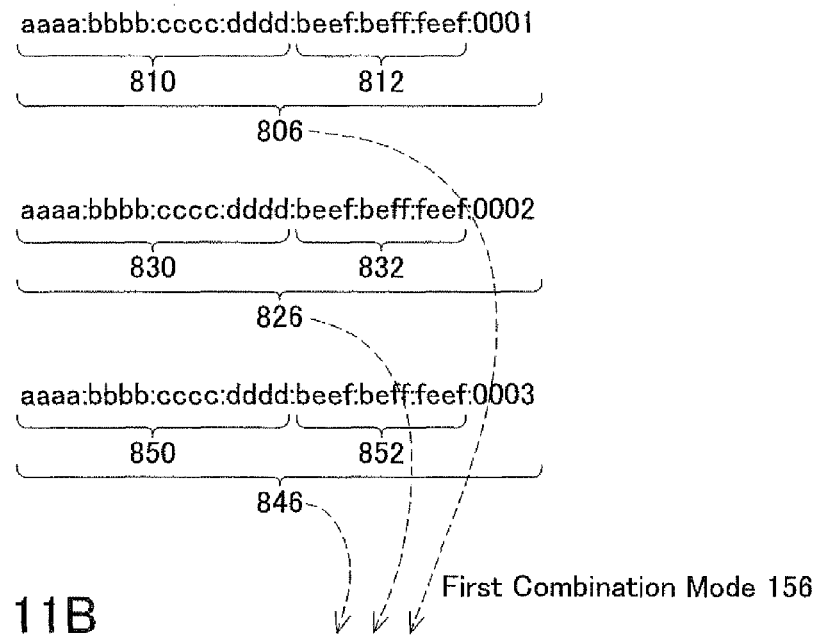

FIG. 12A
Third Combination Mode 160

| Node Name | IPv6 Address | |
|---|---|---|
| printer 50 | ...LAN0001 | ← 860c |
| printer 60 | ...LAN0002 | ← 870c |
| printer 70 | ...LAN0003 | ← 880c |
| | | |

FIG. 12B
892a
892b
Fourth Combination Mode 162

| Node Name | IPv6 Address | |
|---|---|---|
| printer 50 | ... ...0001 | ← 860d |
| printer 60 | ... ...0002 | ← 870d |
| printer 70 | ... ...0003 | ← 880d |
| | | |

ADDRESS INFORMATION PROVIDING DEVICE

CROSS-REFERENCE TO RELATED APPLICATION

This application claims priority to Japanese Patent Application No. 2009-153488, filed on Jun. 29, 2009, the contents of which are hereby incorporated by reference into the present application

TECHNICAL FIELD

The present specification discloses a technique for displaying address information indicating an IPv6 address to be used in an Internet Protocol version 6 (IPv6).

DESCRIPTION OF RELATED ART

Address information indicating the IPv6 address is displayed by 32 hexadecimal values (128-bit values). The address information is usually displayed by partitioning into eight blocks. Thus, one block includes 4 hexadecimal values. A technique is known by which address information is displayed by less than 32 values under a predetermined condition. For example, when all 4 values included in one block are "zero", this block is omitted in the display.

SUMMARY

As described hereinabove, because address information indicating an IPv6 address is displayed by a large number of values (32 values), it is difficult for a person (referred to hereinbelow as "user") viewing the address information to recognize the address information. A technique is necessary for displaying a portion to be recognized by the user within the address information so that this portion can be easily recognized by the user.

Address information indicating an IPv6 address usually includes a prefix portion. For example, it is sometimes desirable that the user recognizes a particular portion other than the prefix portion. The following address information providing device may be used to display the particular portion so that it can be easily recognized by the user. The address information providing device may comprise an obtaining unit configured to obtain address information indicating an IPv6 address, a creation unit configured to create, from the address information, address information for display, and a supplying unit configured to supply the address information for display to a display device. The creation unit may create, for example, but not limited to, the address information for display in which a prefix portion of the address information has been replaced by a particular symbol. The creation unit may create, for example, but not limited to, the address information for display in which the prefix portion of the address information has been omitted.

When there exists a plurality of address information indicating a plurality of IPv6 addresses and a common portion exists that is common between the plurality of address information, it is sometimes desirable that the user recognizes a particular portion (that is, a portion that is not common) other than the common portion of each of the plurality of address information. The following address information providing device may be used to display the particular portion so that it can be easily recognized by the user. The address information providing device may comprise an obtaining unit configured to obtain a plurality of address information indicating a plurality of IPv6 addresses, a creation unit configured to create, from the plurality of address information, a plurality of address information for display, and a supplying unit configured to supply the plurality of address information for display to a display device. In a case where a common portion exists between the plurality of address information, the creation unit may create, for example, but not limited to, the plurality of address information for display in which the common portion of each of the plurality of address information has been replaced by a first particular symbol. In a case where a common portion exists between the plurality of address information, the creation unit may create, for example, but not limited to, the plurality of address information for display in which the common portion of each of the plurality of address information has been omitted.

A control method for realizing the above-described address information providing device is also novel and useful. A computer program is also novel and useful. The computer program may include instructions for ordering a computer mounted on an address information providing device to perform: obtaining address information indicating an IPv6 address (or a plurality of address information indicating Ipv6 addresses); creating the above address information for display (or the above plurality of address information for display) from the address information (or the plurality thereof); and supplying the address information for display (or the plurality thereof) to a display device. The computer program may be included in a computer readable medium.

BRIEF DESCRIPTION OF DRAWINGS

FIGS. 5A to 5C show a mode of replacing a prefix portion;
FIGS. 6A and 6B show a mode of replacing a prefix portion which is identical to a value designated by a user;
FIGS. 7A and 7B show a mode of omitting a prefix portion;
FIGS. 11A to 11C show a first combination mode and a second combination mode;
and
FIGS. 12A and 12B show a third combination mode and a fourth combination mode.

DETAILED DESCRIPTION OF THE PREFERRED EMBODIMENT (System Configuration)

Figure 1:
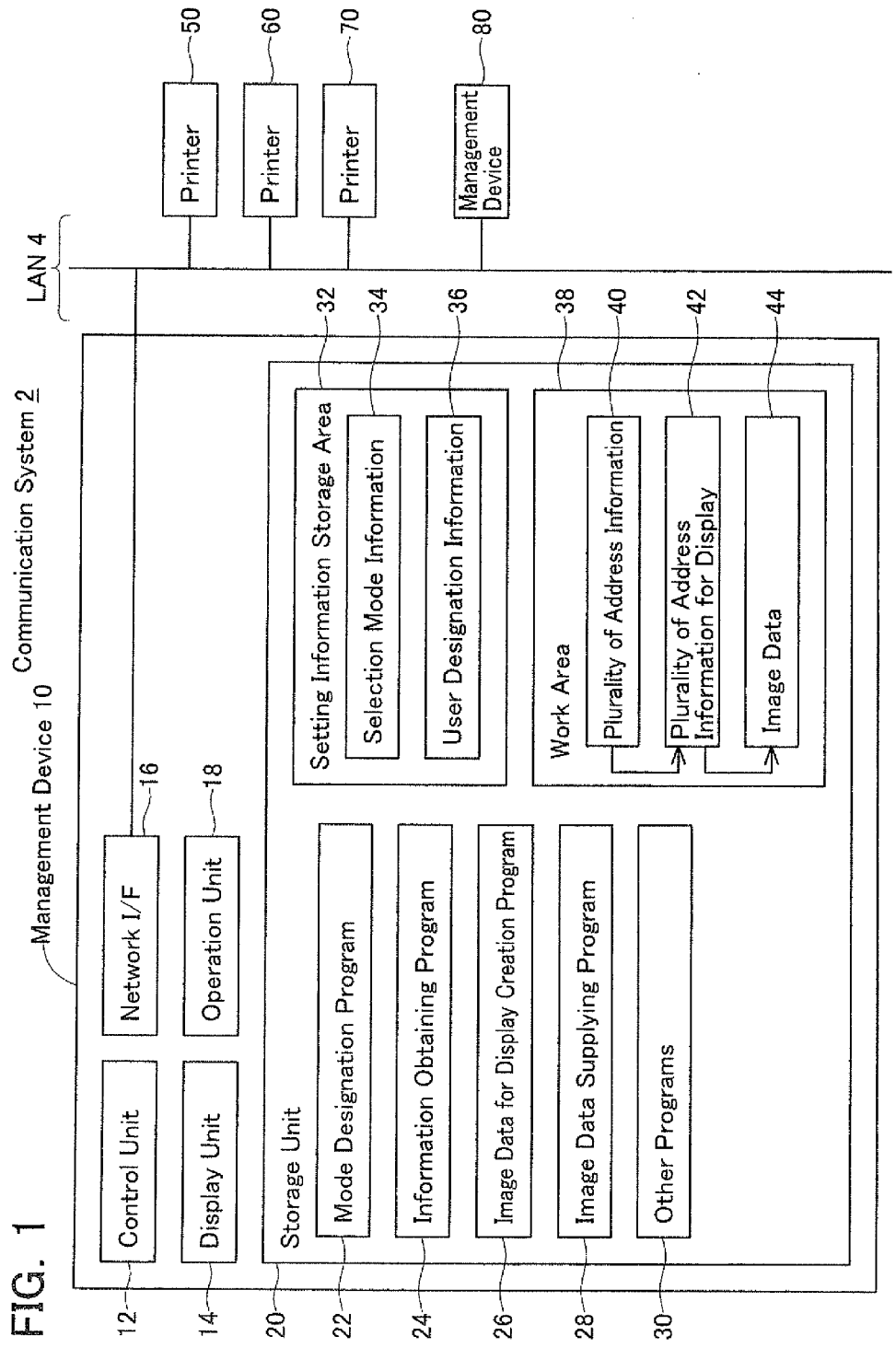
FIG. 1 shows an example of a configuration of a communication system.

An embodiment will be described below with reference to the drawings. FIG. 1 is a schematic diagram of a communication system 2 of the present embodiment. The communication system 2 includes a LAN 4, a plurality of management devices 10, 80, and a plurality of printers 50, 60, 70. The devices 10, 50 to 80 are connected to the LAN 4. The devices 10, 50 to 80 can communicate with each other via the LAN 4.

(Configuration of Management Device)

A configuration of the management device 10 will be described below. The management device 80 has a configuration similar to that of the management device 10. The management device 10 is used by a manager (referred to hereinbelow as "user") who manages the plurality of printers 50 to 70. The management device 10 obtains information from the plurality of printers 50 to 70 and displays the obtained information. The management device 10 includes a control unit 12, a display unit 14, a network interface 16, an operation unit 18, and a storage unit 20. The control unit 12 executes a processing according to programs 22 to 30 stored in the storage unit 20. The display unit 14 displays a variety of information. The network interface 16 is connected to the LAN 4. The operation unit 18 is constituted by a keyboard and a mouse. The user can input various instructions into the management device 10 by operating the operation unit 18.

The storage unit 20 stores the plurality of programs 22 to 30. A mode designation program 22 is a program for ordering the control unit 12 to perform a processing of making a user select one mode from among a plurality of the below-described modes. A mode of displaying an IPv6 address is designated to the management device 10 according to this program. An information obtaining program 24 is a program for obtaining information from the plurality of printers 50 to 70. An image data for display creation program 26 is a program for creating image data for display including the information obtained from the plurality of printers 50 to 70. An image data supplying program 28 is a program for supplying address information for display to a display device. A program 30 is a program other than the above-described programs 22 to 28 (for example, an OS program).

The storage unit 20 further includes a setting information storage area 32 and a work area 38. The setting information storage area 32 stores selection mode information 34 that indicates a mode selected by the user and user designation information 36 that indicates various information (below-described user designation symbol 108, user designation prefix 118, and the like) that is designated by the user. The work area 38 stores information created or obtained by the control unit 12 in the process of executing the processing. In the present embodiment, the work area 38 stores a plurality of address information 40 obtained from the plurality of printers 50 to 70, a plurality of address information for display 42 created from the plurality of address information 40, and image data 44 created from the plurality of address information for display 42.

(Plurality of Modes of Displaying IPv6 Address)

A plurality of modes of displaying an IPv6 address will be explained below with reference to FIG. 2 and FIG. 3. Six modes of the highest order include a non-conversion mode 100, a prefix replacement mode 102, a prefix omission mode 128, a common portion replacement mode 140, a common portion omission mode 152, and a combination mode 154. The non-conversion mode 100 serves to display, without conversion (without conducting the below-described replacement or omission), address information that indicates the IPv6 address.

The prefix replacement mode 102 is a mode for replacing a prefix portion of address information with a particular symbol. A replacement target non-designation mode 104 and a replacement target designation mode 114 are low-order modes of the prefix replacement mode 102. In the replacement target non-designation mode 104, a value of the prefix portion that has to be replaced is not designated by the user. A symbol designation mode 106 and a symbol non-designation mode 110 are low-order modes of the replacement target non-designation mode 104. In the symbol designation mode 106, a user designation symbol 108 ("LAN"), which is a symbol after the replacement of the prefix portion, is designated by the user. Not only the symbols (0 to 9, a to f) that are used in hexadecimal, but also other symbols (for example, letters of alphabet that start from "g", Chinese characters, characters of the hiragana and katakana (Japanese syllabary characters), and other symbols) can be also designated as the user designation symbol 108. For example, in FIG. 2, "LAN" is designated as the user designation symbol 108. In this example, "L" and "N" are the symbols that are not used in hexadecimal. In the symbol non-designation mode 110, a symbol after the replacement of the prefix portion is not designated by the user. Therefore, in the symbol non-designation mode 110, a predetermined symbol 112 ("PRE") is used. Further, in the replacement target designation mode 114, a value of the prefix portion that has to be replaced is designated by the user. In the replacement target designation mode 114, the user can designate a plurality of combination information 116, 122. Each of the combination information 116, 122 is information in which a value of the prefix portion that has to be replaced (first user designation prefix 118, second user designation prefix 124) is associated with a symbol after the replacement (first user designation symbol 120 ("LAN1"), second user designation symbol 126 ("LAN2")).

The prefix omission mode 128 is a mode for omitting the prefix portion of the address information. An omission target non-designation mode 130 and an omission target designation mode 132 are lower-order modes of the prefix omission mode 128. In the omission target non-designation mode 130, a value of the prefix portion that has to be omitted is not designated by the user. In the omission target designation mode 132, a value of the prefix portion that has to be omitted is designated by the user. In the omission target designation mode 132, the user can designate a plurality of values of the prefix portion that has to be omitted (first user designation prefix 134, second user designation prefix 136).

Figure 3:
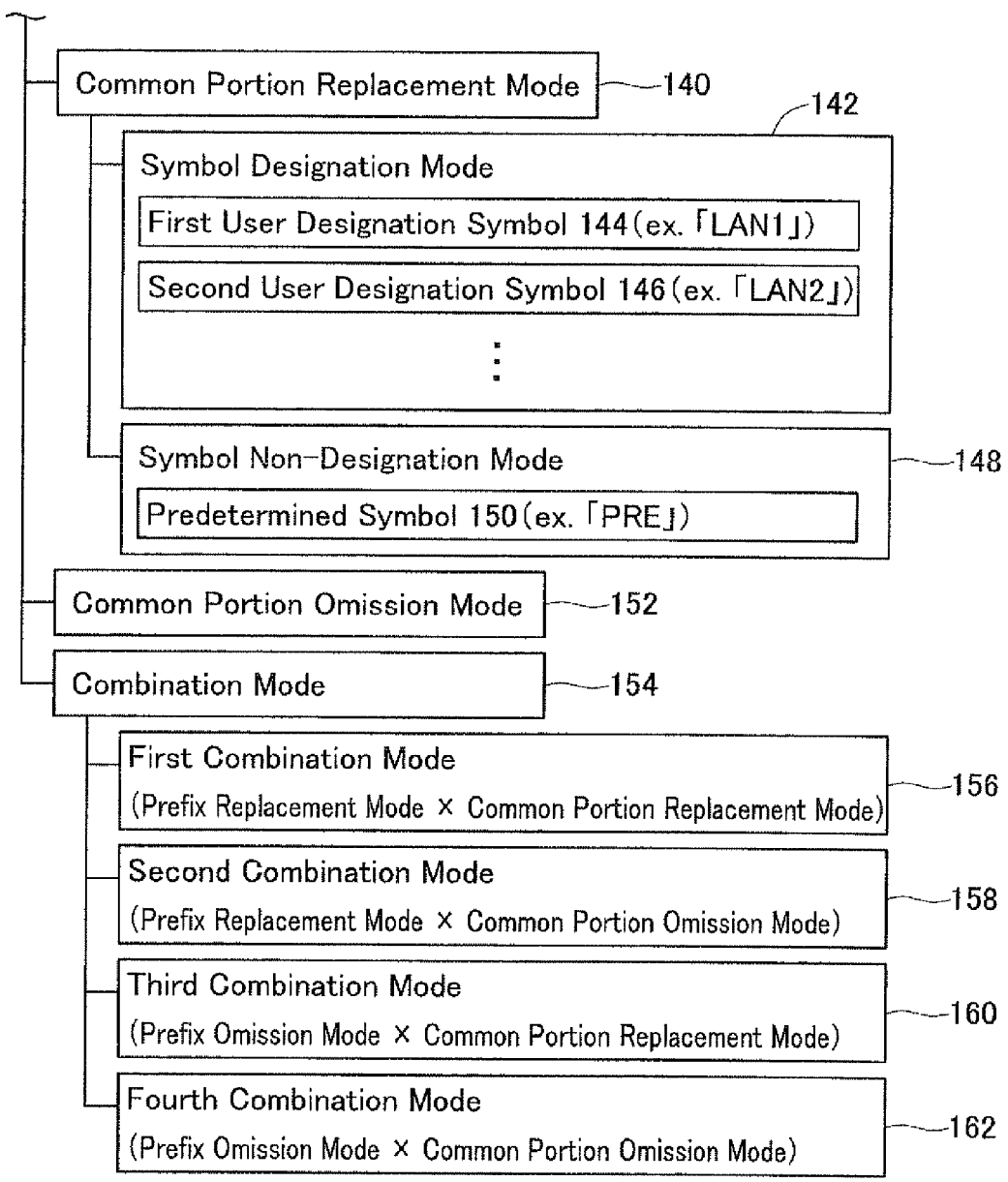
FIG. 3 shows a plurality of modes.

The common portion replacement mode 140 shown in FIG. 3 is a mode for replacing a common portion that is common between a plurality of address information with a particular symbol. A symbol designation mode 142 and a symbol non-designation mode 148 are lower-order modes of the common portion replacement mode 140. In the symbol designation mode 142, a symbol after the replacement of the common portion is designated by the user. In the symbol designation mode 142, the user can designate a plurality of symbols after the replacement (first user designation symbol 144 ("LAN1"), second user designation symbol 146 ("LAN2")). In the symbol non-designation mode 148, a symbol after the replacement of the common portion is not designated by the user. Therefore, in the symbol non-designation mode 148, the predetermined symbol 150 ("PRE") is used.

The common portion omission mode 152 is a mode for omitting the common portion that is common between the plurality of address information. Further, the combination mode 154 is a mode in which one of the prefix replacement mode 102 and the prefix omission mode 128 is combined with one of the common portion replacement mode 140 and the common portion omission mode 152. Therefore, there are four combination modes 156 to 162 that are lower-order modes of the combination mode 154.

(Processing Executed by Management Device)

The processing executed by the control unit 12 of the management device 10 will be described below. The user can start the mode designation program 22 by applying a first operation to the operation unit 18 (see FIG. 1). The control unit 12 executes the following processing according to the mode designation program 22. First, the control unit 12 (see FIG. 1) displays information indicating six modes 100, 102, 128, 140, 152, 154 of the highest order on the display unit 14 (see FIG. 1). By operating the operation unit 18, the user can select one mode from among the six modes 100, etc. In the case where there are lower-order modes of the mode selected by the user, the control unit 12 displays information indicating the lower-order modes on the display unit 14. By operating the operation unit 18, the user can select one lower-order mode. When a mode of even lower order is present, the information display and selection are further conducted. Finally, one mode from among a plurality (thirteen) of modes 100, 106, 110, 114, 130, 132, 142, 148, 152, and 156 to 162 is selected by the user. When it is necessary for the user to designate a user designation symbol (for example, 108 in FIG. 2) and/or a user designation prefix (for example, 118 in FIG. 2), in the one mode finally selected by the user, the user inputs the user designation symbol and/or user designation prefix by operating the operation unit 18. Then, the control unit 12 updates the stored contents of the setting information storage area 32 (see FIG. 1). As a result, information indicating one mode finally selected by the user is stored as the selection mode information 34. The user designation symbol and/or user designation prefix inputted by the user is stored as the user designation information 36.

Figure 4:
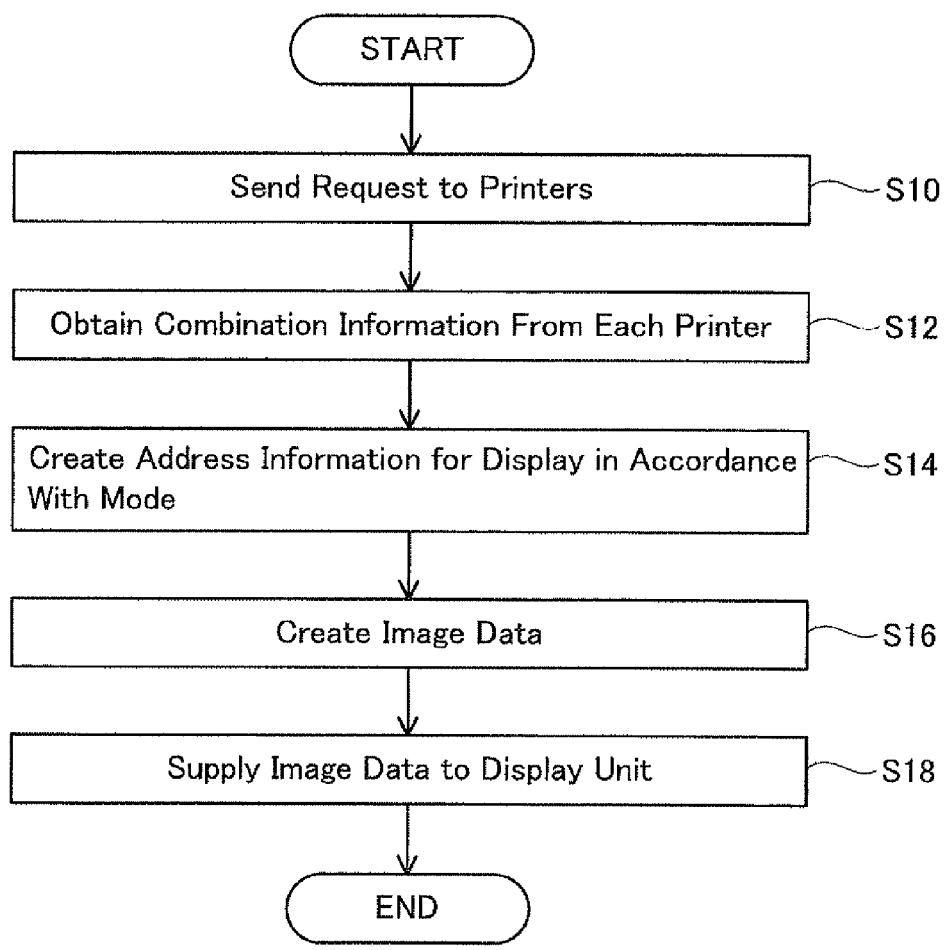
FIG. 4 shows a flowchart of processing executed by a management device.

The processing in which the control unit 12 obtains and displays the address information will be described below. A flowchart of this processing is shown in FIG. 4. The user can start the programs 24 to 28 by applying a second operation to the operation unit 18 (see FIG. 1). The control unit 12 executes the processing shown in FIG. 4 according to the programs 24 to 28.

The control unit 12 sends a request to each of the plurality of printers 50 to 70 (S10). The request may be, for example, a Get command of SNMP (Simple Network Management Protocol). Each of the plurality of printers 50 to 70 sends to the management device 10 combination information 200, 220, 240 (see FIG. 5A) including various information that the printer has. As a result, the control unit 12 obtains the combination information 200, 220, 240 from the plurality of printers 50 to 70, respectively (S12).

FIG. 5A shows examples of combination information 200, 220, 240. The combination information 200 from the printer 50 includes a node name 204 of the printer 50, address information 206 indicating the IPv6 address assigned to the printer 50, and other information 214. The address information 206 of the present embodiment is an aggregatable global unicast address. The address information 206 includes eight blocks 208a to 208h. One block (for example, 208a) includes 4 hexadecimal values. Therefore, the address information 206 includes a total of 32 of hexadecimal values, in other words, a 128-bit value (that is, 128 binary values). One hexadecimal value is represented by a 4-bit value (four binary values). Therefore, one block includes a 16-bit value. The 64-bit value (16 hexadecimal values) of the first half of the address information 206 is called a prefix portion 210. The 64-bit value (16 hexadecimal values) of the second half of the address information is called an interface portion 212. Other information 214 included in the combination information 200 is, for example, status information of the printer 50 and various setting information that has been set in the printer 50.

The combination information 220, 240 from the printers 60, 70 has a configuration similar to that of the combination information 200. Thus, the combination information 220 includes a node name 224 of the printer 60, address information 226 indicating the IPv6 address of the printer 60, and other information 234. The combination information 240 includes a node name 244 of the printer 70, address information 246 indicating the IPv6 address of the printer 70, and other information 254. The address information 226, 246 includes prefix portions 230, 250, respectively, and interface portions 232, 252, respectively.

In FIG. 5, a colon ":" is shown between two consecutive blocks 208a, etc. of the address information 206, 226, 246, but actually the address information 206, 226, 246 includes only 32 values and no colon. Because the below-described address information for display 260, 270, 280 includes the colon, the colon is shown in the address information 206, 226, 246 with reference to the address information for display. The same relates to FIG. 6 and other figures.

In S14 shown in FIG. 4, the control unit 12 reads the selection mode information 34 and the user designation information 36 that have been stored in the setting information storage area 32 (see FIG. 1). Then, the control unit 12 creates a plurality of address information for display 260, 270, 280 (see FIG. 5B) from the plurality of address information 206, 226, 246 included in the combination information 200, 220, 240 in accordance with the selection mode information 34 and the user designation information 36. Thus, the control unit 12 executes the processing of S14 correspondingly to one mode selected by the user from among the above-described 13 modes. The detailed contents of processing for each mode will be described below. The processing of S14 can be also called a processing of converting the plurality of address information 206, 226, 246 into the plurality of address information 260, 270, 280 for display.

Then, the control unit 12 creates image data 290 (see FIG. 5C) including the plurality of address information for display 260, 270, 280 (S16). The image data 290 represent a predetermined table. This table includes a column 292 indicating a node name, a column 294 indicating an IPv6 address, and a column 296 indicating other information. The control unit 12 writes the node numbers 204, 224, 244 contained in the combination information 200, 220, 240 into the column 292 indicating a node name. The control unit 12 also writes the plurality of address information for display 260, 270, 280 that has been created in S14 into the column 294 indicating an IPv6 address. Further, the control unit 12 writes the other information 214, 234, 254 (not shown in FIG. 5C) contained in the combination information 200, 220, 240 into the column 296 indicating other information. The image data 290 are thus completed. As shown in FIG. 5C, the plurality of address information for display 260, 270, 280 is aligned in a direction (vertical direction in FIG. 5C) perpendicular to a direction (horizontal direction in FIG. 5C) in which a plurality of symbols (for example, "LAN:beef:beff:feef:0001") represented by each of the address information 260, 270, 280 are aligned. The control unit 12 supplies (sends) the image data 290 to the display unit 14 (S18). As a result, an image represented by the image data 290 is displayed on the display unit 14.

(1) Non-Conversion Mode 100

The contents of processing of S14 shown in FIG. 4 that is executed correspondingly to each mode will be described below in greater detail. First, the processing conducted when the non-conversion mode 100 (see FIG. 2) has been designated will be described with reference to FIGS. 5A to 5C. The control unit 12, first, specifies the plurality of address information 206, 226, 246 from the plurality of combination information 200, 220, 240. Then, the control unit 12 creates the plurality of address information for display (not shown in the figure) from the plurality of address information 206, 226, 246. The control unit 12 inserts colons between two continuous blocks of one address information 200. Thus, the control unit 12 creates one address information for display (not shown in the figure) by inserting seven colons into one address information 200. The control unit 12 does not conduct the below-described replacement or omission. Therefore, the address information for display that is created herein includes all 32 values contained in the address information 200. The control unit 12 creates respective address information for display from other address information 226, 246 in the same manner as in the case of the address information 200. Furthermore, in the below-described other modes 106 etc., the address information for display also includes colons. Because inserting colons when creating address information for display is similar to the case of the non-conversion mode 100, the explanation thereof is hereinbelow omitted.

(2) Symbol Designation Mode 106

The processing of S14 shown in FIG. 4 that is conducted when the symbol designation mode 106 (see FIG. 2) has been designated will be explained below with reference to FIGS. 5A to 5C. The control unit 12, first, reads the user designation information 36 (see FIG. 1), thereby specifying the user designation symbol 108 (see FIG. 2). In the present embodiment, the user designation symbol 108 is "LAN". Then, the control unit 12 replaces all the values of the prefix portion 210 of the address information 206 with the user designation symbol 108 ("LAN"), thereby creating the address information for display 260. The control unit 12 does not replace the interface portion 212 of the address information 206. The control unit 12 creates the address information for display 270, 280 by replacing the prefix portions 230, 250 of other address information 226, 246 with the user designation symbol 108 ("LAN") in the same manner as in the case of the address information 206.

(3) Symbol Non-Designation Mode 110

The processing conducted when the symbol non-designation mode 110 (see FIG. 2) has been designated will be described below with reference to FIGS. 5A to 5C. The control unit 12 specifies, for example, the symbol 112 (see FIG. 2) that has been predetermined in the image data for display creation program 26 (see FIG. 1). In the present embodiment, the symbol 112 is "PRE". Then, the control unit 12 creates a plurality of address information for display (not shown in the figure) by replacing the prefix portions 210, 230, 250 of the address information 206, 226, 246, respectively, with the symbol 112 ("PRE"). In the plurality of address information for display that is created herein, "LAN" is changed to "PRE" in the plurality of address information for display 260, 270, 280 in FIGS. 5B and 5C.

(4) Replacement Target Designation Mode 114

The processing of S14 shown in S4 that is conducted when the replacement target designation mode 114 (see FIG. 2) has been designated will be explained below with reference to FIGS. 6A and 6B. FIG. 6A shows a plurality of address information 306, 326, 346. FIG. 6B shows image data 390 including a plurality of address information for display 360, 370, 380 that has been created in the replacement target designation mode 114 from the plurality of address information 306, 326, 346. First, the control unit 12 reads the user designation information 36 (see FIG. 1), thereby specifying one combination information 116 (see FIG. 2). The control unit 12 then specifies the first user designation prefix 118 contained in the combination information 116. Then, the control unit 12 determines whether each value of prefix portions 310, 330, 350 of the plurality of address information 306, 326, 346 is identical to a value of the first user designation prefix 118. In the present embodiment, the value of the prefix portion 310 of the address information 306 is identical to the value of the first user designation prefix 118. In this case, the control unit 12 creates the address information for display 360 by replacing the prefix portion 310 of the address information 360 with the first user designation symbol 120 ("LAN1") contained in the combination information 116.

Then, the control unit 12 specifies the other combination information 122 (see FIG. 2) and specifies the second user designation prefix 124 contained in the combination information 122. The control unit 12 determines whether each value of prefix portions 330, 350 of the other address information 326, 346 is identical to the value of the second user designation prefix 124. In the present embodiment, the value of the prefix portion 330 of the address information 326 is identical to the value of the second user designation prefix 124. In this case, the control unit 12 creates the address information for display 370 by replacing the prefix portion 330 of the address information 326 with the second user designation symbol 126 ("LAN2") contained in the combination information 122.

When other combination information is also stored in the user designation information 36 (see FIG. 1), the control unit 12 executes a processing similar to that of the above-described cases of two combination information 116, 122. In the present embodiment, the prefix portion 350 of the address information 346 is not identical to either of the user designation prefixes 118, 124 contained in the combination information 116, 122. In this case, the control unit 12 creates the address information for display 380 in which the prefix portion 350 of the address information 346 has not been replaced.

(5) Omission Target Non-Designation Mode 130

The processing of S14 shown in FIG. 4 that is conducted when the omission target non-designation mode 130 (see FIG. 2) has been designated will be explained below with reference to FIGS. 7A and 7B. FIG. 7A shows a plurality of address information 406, 426, 446. FIG. 7B shows image data 490 including a plurality of address information for display 460, 470, 480 that has been created in the omission target non-designation mode 130 from the plurality of address information 406, 426, 446. The control unit 12 creates the address information for display 460 by omitting all the values of a prefix portion 410 of the address information 406. The control unit 12 does not omit an interface portion 412 of the address information 406. As shown in FIG. 7B, the address information for display 460 includes a symbol 498 indicating that the prefix portion 410 has been omitted. In the address information for display 460, the prefix portion 410 has been omitted, but it can be also said that the prefix portion 410 has been replaced with the symbol 498 (" . . . "). The control unit 12 creates the address information for display 470, 480 by omitting prefix portions 430, 450 of other address information 426, 446 in the same manner as in the address information 406.

(6) Omission Target Designation Mode 132

Figures 8A, 8B:
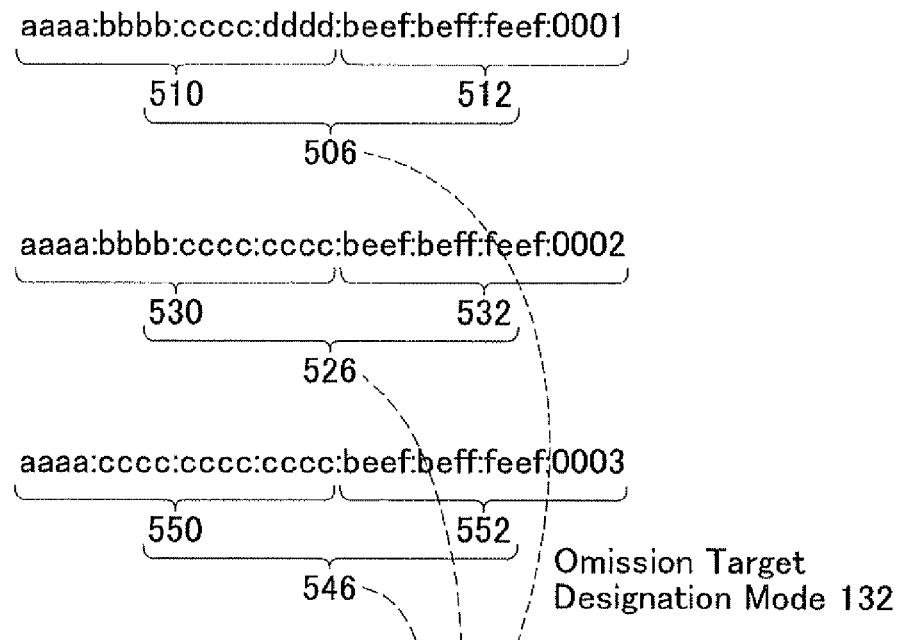
FIGS. 8A and 8B show a mode of omitting a prefix portion which is identical to a value designated by a user.

The processing of S14 shown in FIG. 4 that is conducted when the omission target designation mode 132 (see FIG. 2) has been designated will be explained below with reference to FIGS. 8A and 8B. FIG. 8A shows a plurality of address information 506, 526, 546. FIG. 8B shows image data 590 including a plurality of address information for display 560, 570, 580 that has been created in the omission target designation mode 132 from the plurality of address information 506, 526, 546. First, the control unit 12 reads the user designation information 36 (see FIG. 1), thereby specifying the first user designation prefix 134 (see FIG. 2). Then, the control unit 12 determines whether each value of prefix portions 510, 530, 550 of the plurality of address information 506, 526, 546 is identical to a value of the first user designation prefix 134. In the present embodiment, the value of the prefix portion 510 of the address information 506 is identical to the value of the first user designation prefix 134. In this case, the control unit 12 creates the address information for display 560 by omitting the prefix portion 510 of the address information 506.

Figure 2:
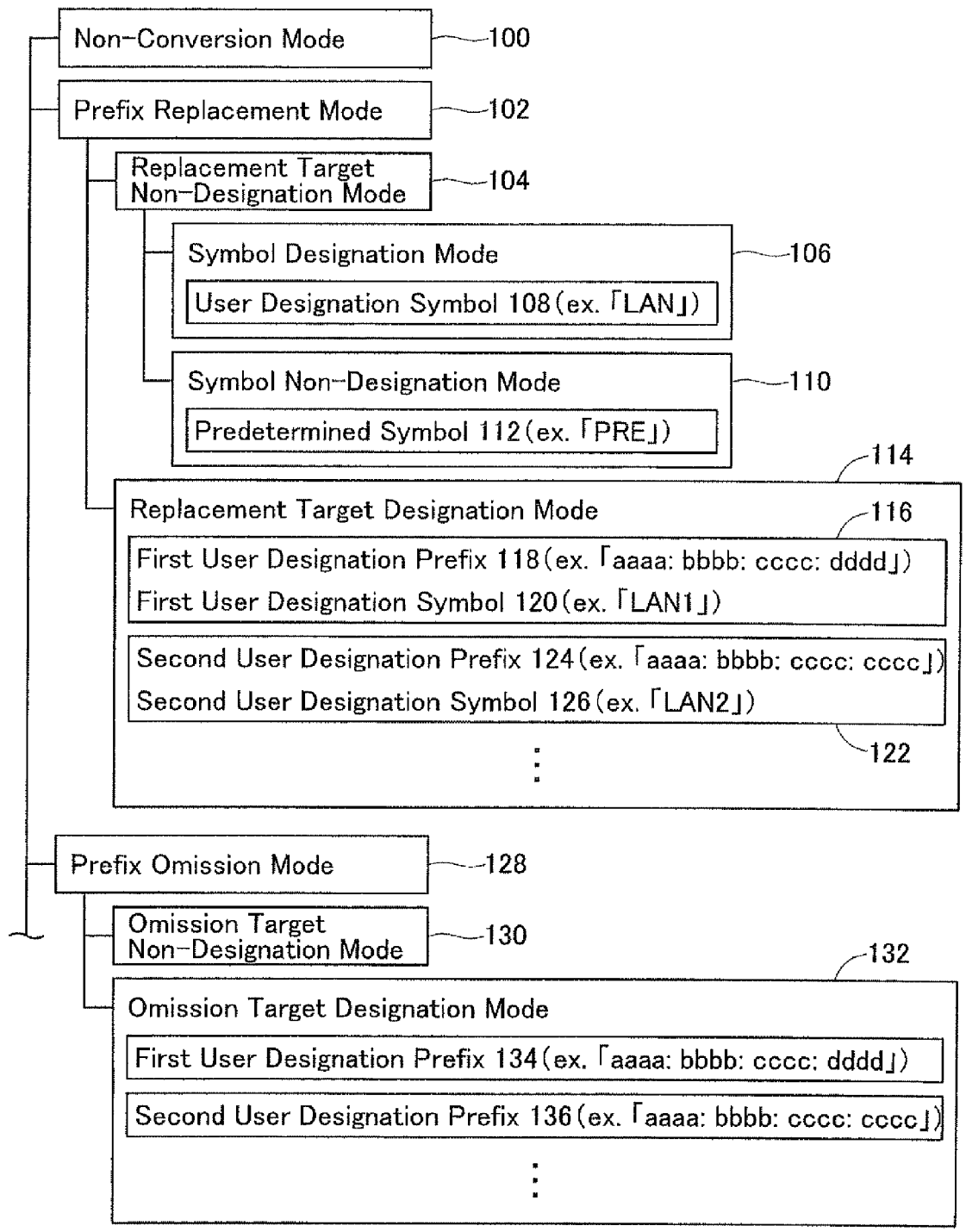
FIG. 2 shows a plurality of modes.

Then, the control unit 12 specifies the second user designation prefix 136 (see FIG. 2). The control unit 12 determines whether each value of prefix portions 530, 550 of other address information 526, 546 is identical to the second user designation prefix 136. In the present embodiment, the value of the prefix portion 530 of the address information 526 is identical to the value of the second user designation prefix 136. In this case, the control unit 12 creates the address information for display 570 by omitting the prefix portion 530 of the address information 526.

When another user designation prefix is also stored in the user designation information 36 (see FIG. 1), the control unit 12 executes the processing similar to that of the above-described cases of the user designation prefixes 134, 136. In the present embodiment, the prefix portion 550 of the address information 546 is not identical to either of the user designation prefixes 134, 136. In this case, the control unit 12 creates the address information for display 580 in which the prefix portion 550 of the address information 546 has not been omitted.

(7) Symbol Non-Designation Mode 148

Figures 9A, 9B, 9C:
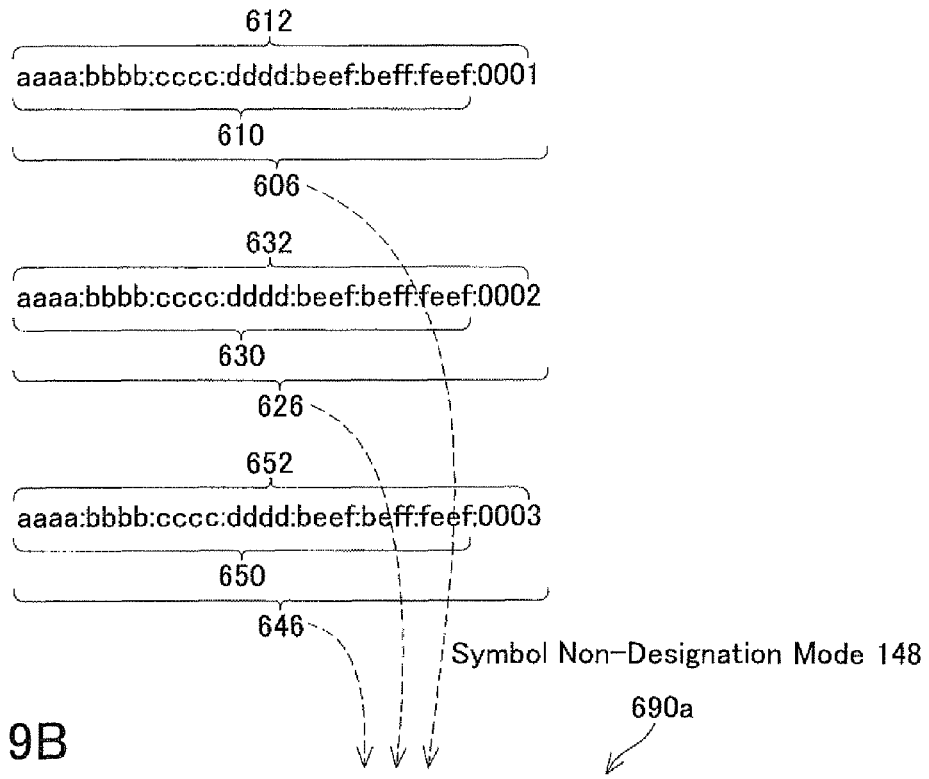
FIGS. 9A to 9C show a mode of replacing a common portion.

The processing of step S14 shown in FIG. 4 that is conducted when the symbol non-designation mode 148 (see FIG. 3) has been designated will be described below with reference to FIGS. 9A and 9B. FIG. 9A shows a plurality of address information 606, 626, 646. FIG. 9B shows image data 690a including a plurality of address information for display 660a, 670a, 680a that has been created in the symbol non-designation mode 148 from the plurality of address information 606, 626, 646. The control unit 12 specifies, for example, the symbol 150 (see FIG. 3) that has been predetermined. In the present embodiment, the symbol 150 is "PRE". Then, the control unit 12 determines whether a value of a first block is common between the plurality of address information 606, 626, 646. In the present embodiment, the first block is "aaaa" for every address information 606, 626, 646. Therefore, the control unit 12 determines that the value of the first block is common. One block that has been determined to be common will be called hereinbelow "common block". Likewise, the control unit 12 determines whether a value of second and subsequent block is common between the plurality of address information 606, 626, 646. In the present embodiment, the values of blocks from the first block ("aaaa") to the seventh block ("feef") are common and a value of the eighth block is not common. Thus, the first to seventh blocks are common blocks.

Then, the control unit 12 determines whether two or more consecutive common blocks exist between the plurality of address information 606, 626, 646 (referred to hereinbelow as "consecutive block determination processing"). As described above, in the present embodiment, the first to seventh blocks are common blocks. Therefore, the control unit 12 makes a positive determination in the consecutive block determination processing. In the case where the positive determination is made in the consecutive block determination processing, the control unit 12 replaces all the values of consecutive common blocks (first to seventh blocks) with the symbol 150 ("PRE"). Thus, the control unit 12 replaces the common portions 610, 630, 650 of the plurality of address information 606, 626, 646 with the symbol 150, thereby creating the plurality of address information for display 660a, 670a, 680a. The control unit 12 does not replace a block (the eighth block) other than the common blocks.

For example, in the case where only one common block is present, the control unit 12 makes the negative determination in the consecutive block determination processing. For example, when two or more common blocks are present, but two or more consecutive common blocks are not present, the control unit 12 makes the negative determination in the consecutive block determination processing. When the negative determination is made in the consecutive block determination processing, the control unit 12 creates a plurality of address information for display (not shown in the figure) in which one or more common blocks that are not consecutive are not replaced.

(8) Symbol Designation Mode 142

Figures 10A, 10B, 10C:
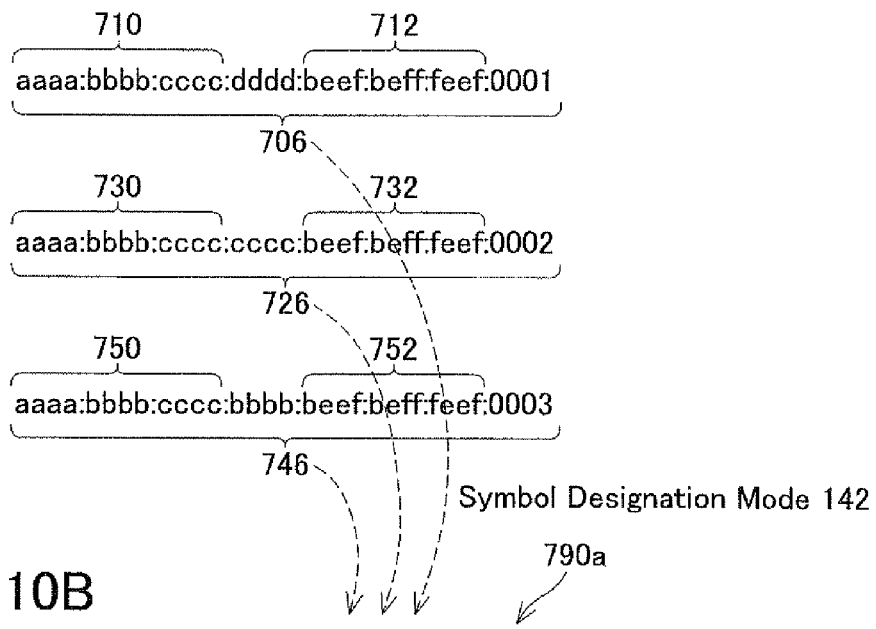
FIGS. 10A to 10C show a mode of replacing a common portion and a mode of omitting a common portion.

The processing of step S14 shown in FIG. 4 that is conducted when the symbol designation mode 142 (see FIG. 3) has been designated will be described below with reference to FIGS. 10A and 10B. FIG. 10A shows a plurality of address information 706, 726, 746. FIG. 10B shows image data 790a including a plurality of address information for display 760a, 770a, 780a that has been created in the symbol designation mode 142 from the plurality of address information 706, 726, 746. The control unit 12 specifies the first user designation symbol 144 and the second user designation symbol 146 (see FIG. 3) by reading the user designation information 36 (see FIG. 1). In the present embodiment, the user designation symbols 144, 146 are "LAN1" and "LAN2", respectively. Similarly to the above-described symbol non-designation mode 148, the control unit 12 then determines whether the values of each block among the plurality of address information 706, 726, 746 are common. In the present embodiment, the blocks from the first block ("aaaa") to the third block ("cccc") are common blocks, the fourth block is not common, the blocks from the fifth block ("beef") to the seventh block "feef") are common, and the eighth block is not common.

The control unit 12 then executes the above-described consecutive block determination processing. As mentioned hereinabove, the first to third blocks are common blocks, and the fifth to seventh block are also common blocks. Therefore, the control unit 12 makes the positive determination in the consecutive block determination processing. In the present embodiment two sets of consecutive common blocks are present. The control unit 12 replaces all the values of the consecutive common blocks of the first set (first to third blocks) with the first user designation symbol 144 ("LAN1") and also replaced all the values of the consecutive common blocks of the second set (fifth to seventh blocks) with the second user designation symbol 146 ("LAN2"). Thus, the control unit 12 replaces first common portions 710, 730, 750 of the plurality of address information 706, 726, 746 with the first user designation symbol 144 ("LAN1") and replaces second common portions 712, 732, 752 with the second user designation symbol 146 ("LAN2"). As a result, the plurality of address information for display 760a, 770a, 780a is created. Other features are similar to those of the symbol non-designation mode 148.

(9) Common Portion Omission Mode 152

The processing of step S14 shown in FIG. 4 that is conducted when the common portion omission mode 152 (see FIG. 3) has been designated will be described below with reference to FIG. 10A and 10C. FIG. 10C shows image data 790b including a plurality of address information for display 760b, 770b, 780b that has been created in the common portion omission mode 152 from the plurality of address information 706, 726, 746. The control unit 12 conducts a processing of determining whether a common block is present and the consecutive block determination processing in the same manner as in the cases of the above-described symbol designation mode 142 and symbol non-designation mode 148. When the positive determination is made in the consecutive block determination processing, the control unit 12 omits all the values of the consecutive common blocks of the first set (first to third blocks) and also omits all the values of the consecutive common blocks of the second set (fifth to seventh blocks). Thus, the control unit 12 omits the first common portions 710, 730, 750 and also the second common portions 712, 732, 752 of the plurality of address information 706, 726, 746. As a result, the plurality of address information for display 760b, 770b, 780b is created. Further, when the negative determination is made in the consecutive block determination processing, the control unit 12 does not omit a common block even if the common block is present.

(Explanation Common to Combination Modes 156 to 162)

The processing of step S14 shown in FIG. 4 that is conducted when the combination modes 156 to 162 (see FIG. 3) have been designated will be described below with reference to FIGS. 11A to 11C and FIGS. 12A and 12B. FIG. 11A shows a plurality of address information 806, 826, 846. In all the combination modes 156 to 162, the control unit 12 executes a processing of determining whether a common block is present and the consecutive block determination processing with respect to portions (that is, interface portions) other than prefix portions 810, 830, 850 of the plurality of address information 806, 826, 846. In the present embodiment, the fifth to seventh blocks are common blocks. Therefore, the control unit 12 makes the positive determination in the consecutive block determination processing.

(10) First Combination Mode 156

In the first combination mode 156, the prefix portion is replaced and the common portion is replaced. When the positive determination is made in the consecutive block determination processing in the first combination mode 156, the control unit 12 replaces the prefix portions 810, 830, 850 of the plurality of address information 806, 826, 846 with the symbol ("PRE") that has been determined in advance and also replaces the common portions 812, 832, 852 with the symbol ("LAN") that has been determined in advance. As a result, as shown in FIG. 11B, a plurality of address information for display 860a, 870a, 880a is created. When the negative determination is made in the consecutive block determination processing, the control unit 12 does not replace the portion other than the prefix portions 810, 830, 850.

(11) Second Combination Mode 158

In the second combination mode 158, the prefix portion is replaced and the common portion is omitted. When the positive determination is made in the consecutive block determination processing in the second combination mode 158, the control unit 12 replaces the prefix portions 810, 830, 850 of the plurality of address information 806, 826, 846 with the symbol ("PRE") that has been determined in advance and omits the common portions 812, 832, 852. As a result, as shown in FIG. 11C, a plurality of address information for 860b, 870b, 880b display is created. When the negative determination is made in the consecutive block determination processing, the control unit 12 does not omit the portion other than the prefix portions 810, 830, 850.

(12) Third Combination Mode 160

In the third combination mode 160, the prefix portion is omitted and the common portion is replaced. When the positive determination is made in the consecutive block determination processing in the third combination mode 160, the control unit 12 omits the prefix portions 810, 830, 850 of the plurality of address information 806, 826, 846 and replaces the common portions 812, 832, 852 with the symbol ("LAN") that has been determined in advance. As a result, as shown in FIG. 12A, a plurality of address information for display 860c, 870c, 880c is generated. Other features are similar to those of the first and second combination modes 156 and 158.

(13) Fourth Combination Mode 162

In the fourth combination mode 162, the prefix portion is omitted and the common portion is omitted. When the positive determination is made in the consecutive block determination processing in the fourth combination mode 162, the control unit 12 omits the prefix portions 810, 830, 850 of the plurality of address information 806, 826, 846 and omits the common portions 812, 832, 852. As a result, as shown in FIG. 12B, a plurality of address information for display 860d, 870d, 880d is created. The address information for display 860d etc. includes a symbol 892a indicating that the prefix portion 810 has been omitted and a symbol 892b indicating that the common portion 812 has been omitted. Other features are similar to those of the first and second combination modes 156 and 158.

The communication system 2 of the present embodiment is described above in detail. As shown in FIGS. 5A to 5C and FIGS. 6A and 6B, in the symbol designation mode 106, the symbol non-designation mode 110, and the replacement target designation mode 114, the prefix portion 210 etc. of the address information 206 etc. is replaced with the user designation symbol 108, 120, 126 ("LAN" etc.) designated by the user or with the symbol 112 ("PRE") that has been determined in advance. The user can easily distinguish between the symbol 108 etc. after the replacement and the interface portions 212, 232, 252, 312, 332, 352 in the address information for display 260, 360 etc. Therefore, the user can easily recognize the interface portion 212 etc.

In particular, in the symbol designation mode 106, the user can designate the symbol that can be easily recognized by the user as the user designation symbol 108 ("LAN"). In this case, the user can easily recognize the user designation symbol 108. As a result, the user can easily distinguish between the user designation symbol 108 and the interface portion 212 etc. and can easily recognize the interface portion 212 etc.

Further, the user can designate any number of symbols (equal to or greater than one) as the user designation symbols 108. For example, the user can designate as the user designation symbols 108 the number of symbols (for example three symbols in the case of "LAN") less than 16, which is the number of values of the prefix portion. Further, in the present embodiment, the symbol 112 (see FIG. 2) that has been determined in advance is the number of symbols (for example, three in the case of "PRE") less than the number of values of the prefix portion. Where the symbols 108, 112 after the replacement are constituted by a comparatively small number of symbols, the user can easily recognize the symbols 108, 112 after the replacement. As a result, the user can easily distinguish between the symbols 108, 112 after the replacement and the interface portions 212 etc. and can easily recognize the interface portion 212 etc. Moreover, in this case, the length (length in the horizontal direction in FIG. 5C) of the address information for display 260 etc. is reduced by comparison with that in a case where the original address information 206 etc. is not converted. For example, even in a case of a comparatively small size of the displayable region of the display unit 14, the display unit 14 can display all the symbols of the address information for display 260 etc.

Further, the user can designate a symbol (in the example shown in FIG. 5B, "L" and "N" from among "LAN") other than the hexadecimal symbol as the user designation symbol 108. In the present embodiment, the symbol 112 ("PRE") that has been determined in advance includes a symbol other than the hexadecimal symbol. The user can easily distinguish between the symbols 108, 112 after the replacement that include a symbol that is not used in the hexadecimal and the interface portion 212 etc. that includes only the symbol used in the hexadecimal, and can easily recognize the interface portion 212 etc.

As shown in FIG. 5C, the plurality of address information for display 260 etc. between which the symbols 108, 112 after the replacement are common is displayed in an aligned manner. Therefore, the user can easily recognize that the symbols 108, 112 after the replacement that are common between the plurality of address information for display 260 etc. correspond to the prefix portion. As a result, the user can easily distinguish between the symbols 108, 112 after the replacement and the interface portion 212 etc, whereby the interface portion 212 etc., can be recognized easily.

Further, as shown in FIGS. 7A and 7B and FIGS. 8A and 8B, in the omission target non-designation mode 130 and the omission target designation mode 132, the prefix portion 410 etc. of the address information 406 etc. is omitted. Therefore, the user can easily recognize the interface portions 412, 432, 452, 512, 532, 552 in the address information for display 460, 560 etc.

As shown in FIGS. 6A and 6B and FIGS. 8A and 8B, in the replacement target designation mode 114 and the omission target designation mode 132, the user can designate a value of the prefix portion that has to be replaced or omitted. The prefix portion can be replaced or omitted as intended by the user.

As shown in FIGS. 9A and 9B and FIGS. 10A and 10B, in the symbol non-designation mode 148 and the symbol designation mode 142, the common portions 610 etc. of the plurality of address information 606 etc. are replaced with the symbol 150 ("PRE") that has been determined in advance or the user designation symbols 144, 146 ("LAN1", "LAN2"). The user can easily distinguish between the symbols 144, 146, 150 after the replacement and the portion other than the common portions in the address information for display 660a, 760a. Therefore, the user can easily recognize the portion that is not common between the plurality of address information 606 etc.

As shown in FIG. 10C, in the common portion omission mode 152, the common portions 710 etc. of the plurality of address information 706 etc. are omitted. Therefore, the user can easily recognize the portions that are not common between the plurality of address information 706 etc.

As shown in FIGS. 11A to 11C, and FIGS. 12A and 12B, in the plurality of combination modes 156 to 162, the replacement or omission of the prefix portion and the replacement or omission of the common portion are conducted. With the combination modes 156 to 162, various merits of the above-described other modes can be obtained.

As follows from the description above, the processing of S10 and S12, processing of S14 and 516, and processing of S18 in FIG. 4 are examples of processing executed by "obtaining unit", "creation unit", and "supplying unit", respectively. Further, the symbols 108, 112, 120, 126 shown in FIG. 2 are examples of "particular symbol", and the user designation prefixes 118, 124, 134, 136 shown in FIG. 2 are examples of "specific value". The symbols 144, 146, 150 shown in FIG. 3 and "PRE" shown in FIG. 11B are examples of "first particular symbol" and "second particular symbol", respectively.

Variation examples of the above-described embodiments are presented below.

(1) Variation Example of the Symbol Designation Mode 106

In the symbol designation mode 106 shown in FIGS. 5A to 5C, the control unit 12 may replace only a value of a part of the prefix portion 210 of the address information 206 with the user designation symbol 108 ("LAN"). Further, the control unit 12 may replace all the values of the prefix portion 210 of the address information 206 together with the values of a part of the interface portion 212 with the user designation symbol 108 ("LAN"). The present variation example can be also used in the symbol non-designation mode 110.

(2) Variation Example of the Replacement Target Designation Mode 114

As shown in FIG. 6B, in the replacement target designation mode 114 of the above-described embodiment, the control unit 12 creates the address information for display 380 that includes all the values of the original address information 346. However, the control unit 12 may create the address information for display that does not include all the values of the address information 346. For example, the control unit 12 may create the address information for display in which the last portion of predetermined bit of the address information 346 is omitted. The range of the omitted portion may be determined, for example, in accordance with the size of the displayable region of the display unit 14. The present variation example can be also used in the address information for display 580 of the omission target designation mode 132 shown in FIGS. 8A and 8B.

(3) Variation Example of the Omission Target Designation Mode 130

In the omission target designation mode 130 shown in FIGS. 7A and 7B, the control unit 12 may create address information for display 460 etc. that includes no symbol 498. Further, the control unit 12 may omit only a part of values of the prefix portion 410 of the address information 406. Further, the control unit 12 may omit not only the prefix portion 410, but also a par of interface portion 412.

(4) Variation Example of the Symbol Non-Designation Mode 148

In the symbol non-designation mode 148 shown in FIGS. 9A and 9B, the control unit 12 may replace only a part of the common portions 610 etc. with "PRE". Further, when two or more consecutive common blocks do not exist, but one common block exists, the control unit 12 may replace this common block with "PRE". Further, the control unit 12 may determine whether a common portion exists between the plurality of address information 606 etc. by using one hexadecimal value (for example, 4 bit) as a unit, rather than using a block unit. For example, the control unit 12 may determine whether a first value ("a") is common between the plurality of address information 606 etc. and similarly may determine whether second and subsequent values are common. The first to thirty first values are common between the plurality of address information 606 etc. shown in FIG. 9A, and the thirty second value ("1" etc.) is not common. In this case, as shown in FIG. 9C, the control unit 12 may create the image data 690b including the plurality of address information for display 660b, 670b, 680b by replacing each of the common portions 612, 632, 652 of the plurality of address information 606 etc. with "PRE".

(5) Variation Example of the Symbol Designation Mode 142

In the symbol designation mode 142 shown in FIG. 10B, the control unit 12 may replace the first common portion 710 etc. and the second common portion 712 etc. with the same symbol. Further, the control unit 12 may replace either of the first common portion 710 etc. and the second common portion 712 etc. The examples and variation examples relating to the replacement of other modes such as the above-described symbol non-designation mode 148 can be also used in the symbol designation mode 142.

(6) Variation Example of the Common Portion Omission Mode 152

In the common portion omission mode 152 shown in FIG. 10C, all the first common portion 710 etc. and the second common portion 712 etc. may not be omitted. For example, the control unit 12 may omit only one of the first and second common portions. Further, for example, the control unit 12 may omit only a part of one common portion. The range of the omitted portion may be determined, for example, in accordance with the size of the displayable region of the display unit 14. Examples and variation examples relating to omission of other modes can be used in the common portion omission mode 152.

(7) Variation Examples of the Combination Modes 156 to 162

In the first to third combination modes 156 to 160 shown in FIGS. 11A to 11C and FIG. 12A, the replacement may be performed with the user-designated symbol, without replacing with the symbols "PRE" or "LAN" that have been determined in advance. In FIG. 11B, a colon may be inserted between the "PRE" and "LAN", and a colon may be inserted between the "LAN" and the eighth block (for example, "0001"). Likewise, in FIG. 12A, a colon may be inserted between "LAN" and the eighth block (for example, "0001"). Further, the examples and variation examples relating to replacement and omission of other modes can be also used in the first to fourth combination modes 156 to 162.

(8) The technique of the above-described examples can be applied not only to a technique of displaying a plurality of address information for display, but also to a technique of displaying only one address information.

(9) In the modes of the above-described examples, when a predetermined operation is executed by the user in the operation unit 18 (see FIG. 1) in a state in which the address information for display is displayed in the display unit 14 (see FIG. 1), the control unit 12 may display the original address information (address information before the replacement or before the omission) on the display unit 14. With such a configuration, the user can view the original address information. Further, the replacement or omission is not always necessary to execute in the processing of S14 shown in FIG. 4 even when, for example, a mode other than the non-conversion mode 100 has been designated. For example, when a display region in which the image data 290 etc. has to be displayed is less than a predetermined size, the omission or replacement may be executed by the control unit 12 in the processing of S14 shown in FIG. 4, and when the display region is larger than the predetermined size, the replacement or omission may not be executed by the control unit 12 in the processing of S14 shown in FIG. 4.

(10) The IPv6 address that is displayed by using the technique of the above-described examples is not limited to the Aggregatable global unicast address and may be another unicast address. For example, it may be a Link-local unicast address or a Unique local unicast address. In these unicast addresses, 64 bits of the first half constitute a prefix portion, and 64 bits of the second half constitute an interface portion. The technique of the above-described examples may be also used in a case of displaying an Anycast address of IPv6. In the Anycast address of IPv6, 64 bits of the first half constitute a prefix portion. Further, the technique of the above-described examples may be also used in a case of displaying a Multicast address. In the Multicast address, predetermined bits (for example, 8 bits) of the head constitute a prefix portion.

(11) In the above-described examples, the management device 10 displays the IPv6 address of printers 50, 60, 70, which are external devices other than the management device itself. However, the management device 10 may also use the technique of the above-described examples and display its own IPv6 address. The management device 10 may provide address information for display to other devices (for example, the management device 80) comprising a display device, without displaying the address information for display in the management device 10. The management device 10 may also display by itself the address information for display that has been created by the management device itself and may provide this address information for display to the management device 80. In this case, the management device 80 may display the address information for display, without executing the processing shown in FIG. 4.

(12) For example, the image data 290 shown in FIG. 5C may include information indicating a correspondence relationship of the values of prefix portions 210, 230, 250 before the replacement and the symbol "LAN" of the prefix portions after the replacement. Thus, the image data 290 may include information indicating that the value "aaaa:bbbb:cccc:dddd" of the prefix portion before the replacement has been replaced by "LAN". Likewise, other image data 390 etc. may include information (list) indicating a correspondence relationship between the values before the replacement and symbols after the replacement.

(13) A portion other than the prefix portion (for example, 64-bit portion of the first half) of address information may be called, for example, an interface portion (for example, 64-bit portion of the second half). The technique disclosed in the present description is not particularly limited by whether the interface portion is replaced or omitted. For example, the management device 10 may replace a part of the interface portion with a symbol other than the above-described particular symbol and may replace the prefix portion and a part of the interface portion all together with the above-described particular symbol. Furthermore, the particular symbol may be also called a particular letter string. In this case, the particular letter string may be constituted by only one letter. The number of letters in the particular letter string may be less than the number (for example, 16) of values of the prefix portion of the address information.

(14) Each of the plurality of address information may include 32 hexadecimal values (for example, one value is a 4-bit value) from the first value to the thirty second value. The management device 10 may determine whether the L-th (L is each integer from 1 to 32) value is common between the plurality of address information. The common portion may include a value that is determined to be common between the plurality of address information. With such a configuration, it is possible to determine whether a common portion exists between the plurality of address information by taking one hexadecimal value as a unit (that is, for every 4 bits). In such a configuration, 4 bits can be considered to correspond to one block.

What is claimed is:
1. An address information providing device comprising:
a processor configured to perform:
obtaining address information indicating an IPv6 address, the address information including 8 blocks, each of the 8 blocks including 4 values represented in hexadecimal notation;

creating, from the address information, address information for display, without changing an interface portion of the address information which is constituted from latter K blocks (K being an integer equal to 1 or more and less than 8) among the 8 blocks of the address information, by specifying a prefix portion of the address information which is constituted from former (8-K) blocks among the 8 blocks of the address information, and by replacing the specified prefix portion to a particular symbol including an alphabetic letter, the alphabetic letter being not used in hexadecimal notation; and supplying the address information for display to a display device.

2. The address information providing device as in claim 1, wherein the particular symbol is a symbol designated by a user.

3. The address information providing device as in claim 1, wherein
if a value of the prefix portion of the address information is identical to a specific value designated by a user, the processor is configured to perform the creating of the address information for display in which the prefix portion of the address information has been replaced by the particular symbol.

4. The address information providing device as in claim 1, wherein
the obtaining includes obtaining a plurality of the address information,
the creating includes creating, from the plurality of the address information, a plurality of the address information for display in which the prefix portion of each of the plurality of the address information has been replaced by the particular symbol,
the creating further includes creating image data including the plurality of the address information for display,
the image data is configured such that the plurality of the address information for display is displayed in a manner that the plurality of the address information for display is aligned along a second direction which is perpendicular to a first direction, the first direction being a direction along which two or more symbols represented by each of the plurality of the address information for display are aligned, and
the supplying includes supplying the image data to the display device.

5. An address information providing device comprising:
a processor configured to perform:
obtaining a plurality of address information indicating a plurality of IPv6 addresses of a plurality of devices, wherein each of the plurality of address information includes N blocks from a 1st block to an N-th block, the N being an integer equal to 2 or more;
determining whether a common portion exists between the plurality of address information corresponding to the plurality of devices, the determining includes determining whether a value of an M-th block is common between the plurality of address information, the M being each of integers from 1 to the N, the common portion includes a specific block that has been determined as the value of the specific block being common between the plurality of address information, and creating, from the plurality of address information corresponding to the plurality of devices, in a case where it is determined that the common portion exists between the plurality of address information corresponding to the plurality of devices, a plurality of address information for display in which the common portion of each of the plurality of address information corresponding to the plurality of devices has been replaced by a first particular symbol including an alphabetic letter, the alphabetic letter being not used in hexadecimal notation; and
supplying the plurality of address information for display to a display device.

6. The address information providing device as in claim 5, wherein
the common portion is included in an interface portion of each of the plurality of address information, and
the processor is configured to perform the creating of the plurality of address information for display in which a prefix portion of each of the plurality of address information has been further replaced by a second particular symbol, regardless of the prefix portion being common or not between the plurality of address information.

7. The address information providing device as in claim 5, wherein
the common portion is included in an interface portion of each of the plurality of address information, and
the processor is configured to perform the creating of the plurality of address information for display in which a prefix portion of each of the plurality of address information has been further omitted, regardless of the prefix portion being common or not between the plurality of address information.

8. The address information providing device as in claim 5, wherein
the creating includes further creating image data including the plurality of address information for display,
the image data is configured such that the plurality of address information for display is displayed in a manner that the plurality of address information for display is aligned along a second direction which is perpendicular to a first direction, the first direction being a direction along which two or more symbols represented by each of the plurality of address information for display are aligned, and
the supplying includes supplying the image data to the display device.

9. A non-transitory computer readable medium storing a computer program, the computer program including instructions for an address information providing device, the instruction ordering the computer to perform:
obtaining address information indicating an IPv6 address, the address information including 8 blocks, each of the 8 blocks including 4 values represented in hexadecimal notation;
creating, from the address information, address information for display, without changing an interface portion of the address information which is constituted from latter K blocks (K being an integer equal to 1 or more and less than 8) among the 8 blocks of the address information, by specifying a prefix portion of the address information which is constituted from former (8-K) blocks among the 8 blocks of the address information, and by replacing the specified prefix portion to a particular symbol including an alphabetic letter, the alphabetic letter being not used in hexadecimal notation; and
supplying the address information for display to a display device.

10. A non-transitory computer readable medium storing a computer program, the computer program including instructions for an address information providing device, the instruction ordering the computer to perform:
obtaining a plurality of address information indicating a plurality of IPv6 addresses of a plurality of devices, wherein each of the plurality of address information includes N blocks from a 1st block to an N-th block, the N being an integer equal to 2 or more;

determining whether a common portion exists between the plurality of address information corresponding to the plurality of devices, the determining includes determining whether a value of an M-th block is common between the plurality of address information, the M being each of integers from 1 to the N, the common portion includes a specific block that has been determined as the value of the specific block being common between the plurality of address information, and creating, from the plurality of address information corresponding to the plurality of devices, in a case where it is determined that the common portion exists between the plurality of address information corresponding to the plurality of devices, a plurality of address information for display in which the common portion of each of the plurality of address information corresponding to the plurality of devices has been replaced by a first particular symbol including an alphabetic letter, the alphabetic letter being not used in hexadecimal notation; and supplying the plurality of address information for display to a display device.

\* \* \* \* \*